United States Patent
Solfrank

(10) Patent No.: US 8,096,278 B2
(45) Date of Patent: Jan. 17, 2012

(54) COMPENSATION SHAFT OF AN INTERNAL COMBUSTION ENGINE

(75) Inventor: Peter Solfrank, Frensdorf (DE)

(73) Assignee: Schaeffler KG, Herzogenaurach (DE)

( * ) Notice: Subject to any disclaimer, the term of this patent is extended or adjusted under 35 U.S.C. 154(b) by 412 days.

(21) Appl. No.: 12/322,252

(22) Filed: Jan. 30, 2009

(65) Prior Publication Data

US 2009/0205603 A1  Aug. 20, 2009

(51) Int. Cl.
*F02B 75/06* (2006.01)
(52) U.S. Cl. .............. 123/192.2; 464/180; 74/604
(58) Field of Classification Search .......... 123/192.2; 74/603, 604; 384/180
See application file for complete search history.

(56) References Cited

U.S. PATENT DOCUMENTS

| | | | | |
|---|---|---|---|---|
| 2,674,904 | A * | 4/1954 | Dickson | 74/570.1 |
| 3,710,774 | A * | 1/1973 | Weseloh et al. | 123/192.2 |
| 4,028,963 | A * | 6/1977 | Nakamura et al. | 74/604 |
| 4,377,992 | A * | 3/1983 | Zeilinger et al. | 123/192.2 |
| 4,819,505 | A * | 4/1989 | Takubo et al. | 74/603 |
| 6,418,902 | B1 * | 7/2002 | Ericson | 123/192.2 |
| 6,581,495 | B2 * | 6/2003 | Cagney et al. | 74/603 |

* cited by examiner

*Primary Examiner* — Michael Cuff
*Assistant Examiner* — Hung Q Nguyen
(74) *Attorney, Agent, or Firm* — Charles A. Muserlian

(57) ABSTRACT

A compensation shaft for a multi-cylinder engine comprising at least three bearing pegs (1*a*, 1*b*, 2*b*) and unbalanced masses (3*a*, 3*b*, 3*c*) arranged respectively in a region of each bearing peg (1*a*, 1*b*, 2), wherein at least one of the bearing pegs (1*a*; 1*b*; 2) as mounting element possesses an enhanced mounting lash "s", so that this bearing peg participates in the mounting of the compensation shaft only after a pre-defined flexion of the compensation shaft has taken place.

8 Claims, 1 Drawing Sheet

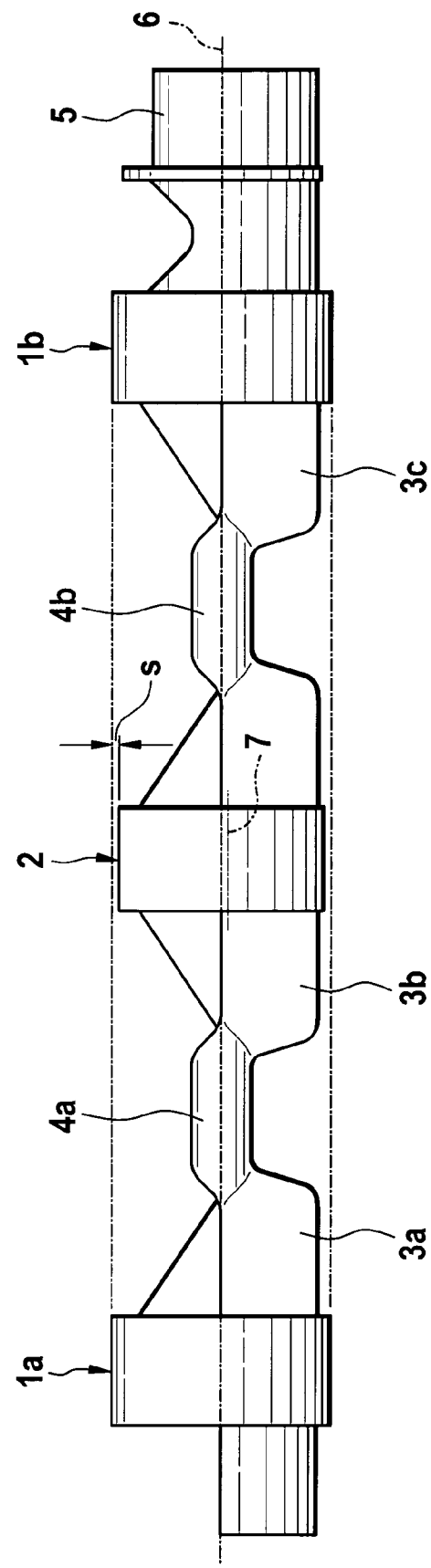

COMPENSATION SHAFT OF AN INTERNAL COMBUSTION ENGINE

FIELD OF THE INVENTION

The invention concerns a compensation shaft for a multi-cylinder engine, said compensation shaft comprising at least three bearing pegs and unbalanced masses arranged respectively in a region of each bearing peg.

BACKGROUND OF THE INVENTION

During the operation of an internal combustion piston engine, gas and mass forces are produced per cylinder of the internal combustion engine and lead to a resulting piston force per cylinder. Depending on the number and arrangement of the cylinders along a crankshaft of the internal combustion engine, the individual piston forces overlap each other in a different manner. An unfavorable overlap leads to the occurrence of free forces and torques and to an additional loading of the engine supports as well as to greater operating noises. For this reason, so-called compensation shafts are used in present-day internal combustion piston engines in which the overlap of the piston forces of the cylinders is unfavorable. These compensation shafts comprise unbalanced masses that are purposefully arranged along the shaft so as to counteract the occurring free forces and torques. Depending on whether the forces and torques concerned are of the first or the second order, the compensation shafts rotate at the same speed of rotation or at double the speed of rotation of the crankshaft.

PRIOR ART

A compensation shaft for an internal combustion piston engine known from DE 103 49 201 A1 comprises two weight sections each of which is connected via profiled ends to mounting elements. With the help of compensation shafts composed of individual components, the central mounting element can be configured with a smaller diameter, so that friction at this location can be reduced.

A drawback of the prior art is that in the range of low-speed rotation of the compensation shaft the central mounting location is subjected only to a very low loading but still causes a certain amount of friction.

OBJECTS OF THE INVENTION

It is therefore an object of the invention to provide a compensation shaft in which the mounting arrangement is optimized with regard to friction losses over the entire speed range of rotation of the compensation shaft.

This and other objects and advantages of the invention will become obvious from the following detailed description.

SUMMARY OF THE INVENTION

The invention achieves the above objects by the fact that at least one of the bearing pegs as a mounting element possesses an enhanced mounting lash, so that this bearing peg participates in the mounting of the compensation shaft only after a pre-defined flexion of the compensation shaft has taken place. In lower speed ranges of the compensation shaft, the loading of the mounting location is low, so that not all the bearing pegs are required for effecting a stable mounting of the compensation shaft. At higher speeds of rotation of the compensation shaft, the flexion of the compensation shaft increases, so that, then, the bearing peg or pegs having the enhanced mounting lash also participate in the mounting of the compensation shaft. Because this participation occurs only after a pre-defined flexion of the compensation shaft, the bearing pegs with the enhanced mounting lash do not contribute to friction losses in the low-speed range of rotation of the compensation shaft.

According to a further development of the invention, the bearing peg as a mounting element possessing the enhanced mounting lash is the central bearing peg. In this case, the compensation shaft preferably comprises three bearing pegs. In a compensation shaft comprising an even number of bearing pegs, the central peg is herewith defined to be the two central bearing pegs, whereas in the case of an odd number of bearing pegs, it is explicitly the central bearing peg that is meant. By arranging the rest of the bearing pegs, which always participate in the mounting of the compensation shaft, on the ends of the shaft, a reliable mounting of the shaft is assured.

In addition, with the aim of providing a continuous contact force build-up at the respective mounting locations, another feature of the invention provides that the bearing peg possessing the enhanced mounting lash comprises a central axis that is arranged eccentrically with respect to the longitudinal axis of the compensation shaft in direction of the unbalanced mass.

According to a further feature of the invention, connections between the unbalanced masses are constituted by flexible sections. Due to this measure, upwards from a pre-determined loading through the mass forces of the unbalanced masses, a displacement of the respective section of the compensation shaft is promoted and this leads to a participation of the bearing peg having the enhanced mounting lash in the mounting of the shaft.

According to a further development of the invention, the flexible sections have a circular cross-section with a reduced diameter. An advantage of this is that, through the circular cross-section good strength values and functional reliability of the compensation shaft are obtained despite the diameter reduction.

According to a further feature of the invention, the compensation shaft is made of a forged steel material. This has the advantage of a low-cost and simple manufacture of the compensation shaft.

Further measures of improvement of the invention are described more closely in the following together with the description of a preferred example of embodiment of the invention with reference to the appended FIGURE.

EXAMPLE OF EMBODIMENT

The sole FIGURE shows a compensation shaft of the present invention comprising bearing pegs 1a, 1b and 2 and unbalanced masses 3a, 3b and 3c. The unbalanced masses 3a-3c are connected to one another by flexible sections 4a and 4b, each of which has a smaller diameter and a circular cross-section. Compared to the bearing pegs 1a and 1b, the bearing peg 2 has a reduced diameter, so that, in the installed state of the compensation shaft in a crankcase, not illustrated, in an internal combustion engine, a mounting lash enhanced by the factor "s" is formed at one mounting location of the crankcase.

A central axis of the bearing peg 2 is identical to the longitudinal axis 6 of the compensation shaft. Alternatively, the invention also provides that a central axis of the bearing peg 2, identified at 7 in the FIGURE, may extend eccentrically to the longitudinal axis 7 in direction of the unbalanced masses of the compensation shaft. The eccentricity of this central axis 7 is oriented in the unbalanced mass direction of the compensation shaft.

At one of its ends, the compensation shaft further comprises a journal 5 on which a gearwheel or a belt pulley for connecting the compensation shaft to the crankshaft of the internal combustion engine through a drive system is arranged. Conceivable in this connection as drive systems are a gearwheel connection, a chain drive or a toothed belt drive. It will further be clear to a person skilled in the art that sliding bearings or rolling bearings are also suitable for the mounting of the compensation shaft.

During operation of the internal combustion engine, the compensation shaft rotates at the same speed or at double the speed of rotation of the crankshaft depending on whether free forces and torques of the first or the second order have to be compensated for. Due to the enhancement of the mounting lash of the bearing peg 2 by the factor "s", in the low-speed range of rotation of the compensation shaft it is only the bearing pegs 1a and 1b that participate in the mounting of the shaft. In the range of higher speeds of rotation, the mass forces of the unbalanced mass 3b and the flexible sections 4a and 4b cause a movement of the unbalanced mass 3b together with the bearing peg 2 in the unbalanced mass direction. It is only when the mounting lash "s" of the bearing peg 2 has been overcome that this bearing peg 2 participates actively in the mounting of the compensation shaft. This leads to a reduction of the friction losses caused by the shaft mounting in the low-speed range of rotation, whereas in the high-speed range, the bearing peg 2 guarantees a stable mounting of the compensation shaft.

The invention claimed is:

1. A compensation shaft for a multi-cylinder engine comprising at least three bearing pegs and unbalanced masses arranged respectively in a region of each bearing peg, wherein at least one of the bearing pegs as a mounting element possesses an enhanced mounting lash "s", so that this bearing peg participates in mounting the compensation shaft only after a pre-defined flexion of the compensation shaft has taken place.

2. The compensation shaft of claim 1, wherein the at least one bearing peg as the mounting element possessing the enhanced mounting lash "s" is the central bearing peg.

3. The compensation shaft of claim 1 wherein the compensation shaft comprises three bearing pegs.

4. The compensation shaft of claim 1, wherein the at least one bearing peg as the mounting element possessing the enhanced mounting lash "s" comprises a central axis that is arranged eccentrically with respect to a longitudinal axis of the compensation shaft in unbalanced mass direction.

5. The compensation shaft of claim 1, wherein flexible sections are arranged as connections between the unbalanced masses.

6. The compensation shaft of claim 5, wherein each of the flexible sections comprises a circular cross-section with a reduced diameter.

7. The compensation shaft of claim 1, wherein the compensation shaft is made of a forged steel material.

8. An internal combustion engine for an automotive vehicle comprising at least one compensation shaft of claim 1.

* * * * *